Jan. 17, 1956 N. C. PRICE 2,730,863
GASEOUS FUEL TURBINE POWER PLANT HAVING
PARALLEL CONNECTED COMPRESSORS
Filed April 16, 1948 4 Sheets-Sheet 3

INVENTOR.
NATHAN C. PRICE
BY
George Sullivan
Agent

Fig. 6

INVENTOR.
NATHAN C. PRICE

United States Patent Office 2,730,863
Patented Jan. 17, 1956

2,730,863

GASEOUS FUEL TURBINE POWER PLANT HAVING PARALLEL CONNECTED COMPRESSORS

Nathan C. Price, St. Helena, Calif., assignor to Lockheed Aircraft Corporation, Burbank, Calif.

Application April 16, 1948, Serial No. 21,514

17 Claims. (Cl. 60—39.15)

This invention relates to internal combustion gas turbines and relates more particularly to power plants of this type adapted to utilize gaseous fuel.

The present invention is concerned with gas turbines suitable for the utilization of natural gas, waste or by-product combustible gases of industrial processes and other appropriate combustible gases of fuels and incorporates certain features and combinations of features which adapt the plants for the efficient production of shaft horsepower. Thus, while not restricted to any given use or application, the invention is well suited for embodiment in a stationary engine or power plant for driving an alternator or generator, auxiliary equipment, etc. while being itself motivated by inexpensive waste or readily available fuel.

It is a general object of the present invention to provide a simple, inexpensive and economical internal combustion turbine power plant of the general character referred to above.

It is another object of the invention to provide a power plant of the class mentioned embodying a plurality of rotor units, for example two compressor-turbine units, and one turbine unit for producing useful load driving power, the several units being constructed, related and coordinated to obtain a relatively high efficiency and a uniform dependable output of power. The rotors and the various blading of the compressor-turbine units may be identical and the rotor and turbine blading of the turbo unit may be the same as in the compressor-turbine units with the compressor blading omitted, thus simplifying the construction and materially reducing the cost of manufacture and upkeep.

Another object of the invention is to provide a gas turbine of the class referred to in which the gaseous fuel is introduced at the inlet ends of the compressors together with the air to be thoroughly mixed with the air so that efficient combustion is obtained and so that the gaseous fuel is subjected to the heat of compression and therefore introduced into the reaction or combustion chamber at the same temperature as the compressed air.

Another object of the invention is to provide a power plant of this type in which the compressor-turbine units are in functionally parallel relationship with the compressors, supplying the compressed air and gas mixture to the reaction chamber and have their turbines receiving the driving or propellant gases of combustion and excess air, if any, from the common reaction chamber and the turbine unit is in parallel relationship with the turbines of the other units to also receive the driving gases of combustion and air from the reaction chamber. With this simple, compact arrangement the function of the compressor-turbine units is to compress the air and fuel mixture for delivery to the reaction chamber and the sole function of the turbine unit is to drive the outside or useful load. By proper design of the nozzle diaphragms of the turbines and/or by relating the designs of the intermediate blading rows of the several turbines, the desired rotative speed of the units and the desired power output may be obtained.

Another object of the invention is to provide a gas turbine power plant embodying a simple, yet particularly effective, means for internally cooling the several rotors and their bearings to increase the thermal efficiency of the plant. The compressor-turbine rotors and the turbine rotor have internal cooling passages following generally their peripheral contours and rapidly flowing cooling air or water is circulated through these passages and through the bearings of the rotors to cool the same before being discharged into the exhaust streams of the turbines.

A further object of the invention is to provide a gas turbine power plant of the class described embodying an automatic control system which maintains a substantially constant rotative speed of the power plant output shaft while at the same time preventing the development of excessive temperatures in the turbines. The automatic control of the invention includes a speed responsive means for regulating the fuel control valves and a temperature sensitive means for modulating or damping the action of the speed responsive means in the event that excessive temperature variations develop in the turbines.

Other objectives and features of the invention will become apparent from the following detailed description of a typical preferred embodiment of the invention wherein:

Figure 6 is a diagrammatic view of the control circuits and related parts of the power plant.

The power plant of the invention, as illustrated in the drawings, may be said to comprise, generally, two compressor-turbine units 10, a combustion or reaction chamber 11 receiving the compressed air and fuel mixture from the units 10, a turbine unit 12 operated by the gases of combustion and air received from the chamber 11 and driving a load 13, a control system 14 for maintaining substantially constant speed of operation of the turbine unit 12, and other elements, the details and functions of which will be hereinafter described.

The compressor-turbine units 10 serve during operation of the power plant to continuously receive and compress atmospheric air and a combustible gas and to deliver the compressed air and gas mixture to the reaction chamber 11. The particular power plant illustrated includes two of these units 10, it being understood that other embodiments of the invention may incorporate one, two, three, or more units 10. The two units 10 of this particular power plant may be substantially identical and corresponding reference numerals are applied to corresponding parts of the units. Each unit 10 includes a compressor casing 15 provided at its forward end with an inlet screen 16. The forward or intake ends of the compressor housings 15 are flaring or divergent and the screens 16 are hollow cage like structures of metal screening or the like, extending forwardly from the enlarged ends of the housings. The housing 15 are annular or tubular and their rear ends are somewhat flaring or divergent to join the walls of annular diffusers 17. The casing assemblies of the compressor-turbine units 10 further include turbine housings 18. These housings are axially aligned with the compressor housings 15 of their respective units 10 and are rearwardly divergent or flaring tubular structures of heat resistant material. The forward end portions of the turbine housings 18 are forwardly and laterally curved to assist in defining the direction changing entrances of the turbines as will later be more fully described. Cylindrical rings 19, split or divided into segments of, say, approximately 180° extent, are positioned between the adjacent ends of the compressor and turbine housings 16 and 18. The casing assemblies of the units 10 just described, may be suitably mounted in horizontal positions on an appropriate frame or bed 20. While the units 10 may be positioned in any required or selected manner, I have shown them arranged in spaced substantially parallel relationship.

Figure 2:
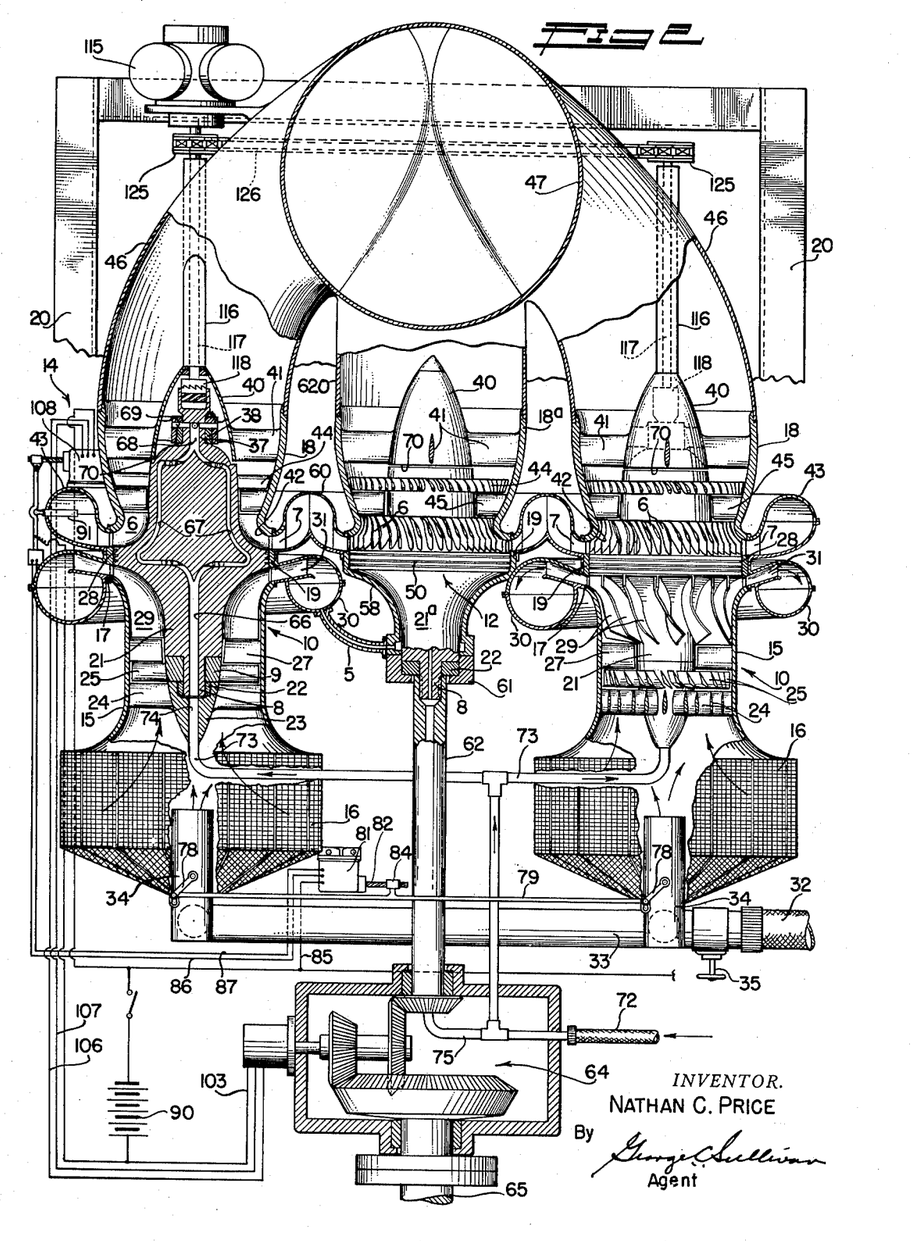
Figure 2 is a slightly enlarged horizontal detailed sectional view of the power plant showing certain of the associated control circuits in a diagrammatic manner.
Figure 5:
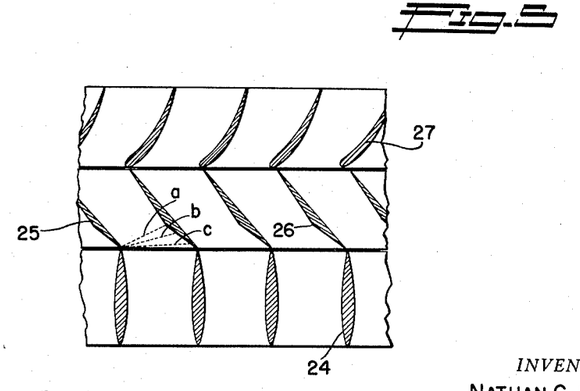
Figure 5 is a fragmentary enlarged developed view of the blading of one of the compressors.
Figure 8:
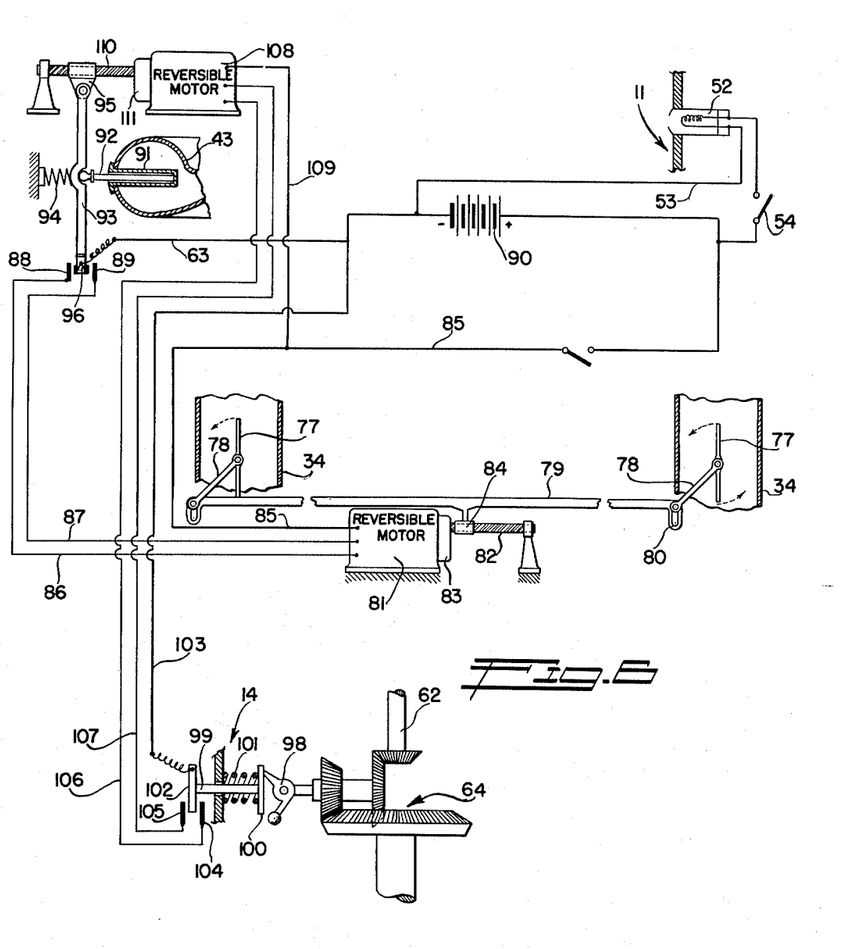

Each compressor-turbine unit 10 further includes a rotor 21 arranged coaxially within the casing assembly above described and journaled adjacent its opposite ends for free rotation. The rotors 21 are combined compressor and turbine wheels carrying both compressor blading and turbine blading and are preferably, though not necessarily, integral precision castings of heat treatable chromium steel or the like. The forward ends of the rotors 21 have reduced hubs 8 carried by suitable bearings 22 which, in turn, are supported in stationary caps 23 of tapered or streamlined configuration. The bearings 22 are preferably of the pivoted segment type. A plurality of spaced flow straightening vanes 24 project inwardly from the walls of each compressor casing 15 to centrally support the caps 23 at the forward end of the rotor. As best illustrated in Figures 2 and 5, the flow straightening vanes 24 are radial and are streamlined or substantially airfoiled shaped in cross section.

The forward portion of each rotor 21 carries a row of supersonic compressor blades 25 positioned immediately behind the stationary flow straightening vanes 24. The blades 25 are secured to rings 9 press-fitted or otherwise fixed on the rotor hubs 8. As shown in Figure 5, the blades 25 have a substantial pitch and are triangular in cross section, being provided with straight plain forward faces and rear faces each having a pair of angularly related surfaces joining at an apex line 26. This type of blade of triangular configuration is designed to eliminate or materially reduce the propagation of heavy rearwardly moving shock waves which might otherwise occur when the velocities are of sonic or supersonic values. A comparatively gentle, normal (or transverse) shock wave $a$ extends from the leading edge of one blade 25 in the direction of the apex 26 of the adjacent blade 25 where it joins or sets up interference with the shock wave propagated at said apex so that the heavy shock waves are prevented in this region. One or more light oblique shock waves such as $b$, and $c$, may occur prior to the normal shock $a$, thereby approaching a process of adiabatic compression of the air. These light, oblique shocks are generated from the blade surface between the blade leading edge and its apex 26. The axial velocity of the air-gas mixture entering the blades 25 may be approximately sonic. The housing 15 of each unit 10 is provided on its inner surface with a row of radially arranged inwardly extending stationary diffuser or counter-vanes 27. The vanes 27 stand immediately behind the supersonic blade 25.

The rotors 21 of the units 10 have intermediate portions of increased external diameter and the compressor housings 15, together with the forward faces of these enlarged rotor parts are formed and related to define compression chambers. As clearly shown in Figure 2, the forward faces of the rotor enlargements curve axially and radially outward to cylindrical peripheral surfaces 28 and these curved faces are spaced from and related to the flaring rear portions of the housings 15 to leave or define the compression chambers. The chambers gradually diminish in flow capacity in the rearward and outward direction to terminate at relatively small annular exits discharging into the abovementioned stationary diffusers 17. Impeller or compressor vanes 29 are provided on the rotors 21 to operate in the compressor chambers. The vanes 29 extend rearwardly from immediately adjacent the rows of diffuser vanes 27 and continue along the curved forward faces of the rotor enlargements to their cylindrical peripheries 28. The tips or outer edges of the vanes 29 conform with and have suitable clearance with the curved inner surfaces of the rear flaring portions of the housings 15. The vanes 29 have forwardly curved or inclined forward parts and substantially axial intermediate and rear portions.

The compressor parts of the units 10 discharge the compressed air and gaseous fuel mixture through the annular diffusers 17 into scrolls 30. The diffusers 17 contain rows of spaced stationary diffuser vanes 31 and are arranged to discharge the air and fuel mixture along the curved internal surfaces of the scroll as indicated by the arrows in Figure 2. The scrolls in turn deliver the compressed air and fuel mixture to the reaction chamber 11 to be later described and the scrolls are preferably of gradually increasing capacity in the direction of fluid flow therein.

In accordance with the invention, the fuel is introduced to the compressor-turbine units 10 ahead or in front of the above described compressor blading to be induced into the air stream flowing into the compressors so as to be thoroughly admixed with the air by the time it enters the combustion chamber. In the drawings, I have shown a line 32 for conducting the fuel to the power plant from a source of supply, not shown. The pipe 32 discharges into a manifold pipe 33 extending transversely in front of the two compressor-turbine units 10 and the pipe 32 has arms or branches 34 extending into the air screens 16. The ends of the pipe branches 34 are axially aligned with and spaced forwardly from the above described compressor caps 23 within the screens 16 so that the gaseous fuel flows into the compressors together with the air. A manually operated master control valve 35 may be provided in the manifold pipe 33 or the supply pipe 32. Any appropriate or available gaseous fuel may be employed in the power plant. The following is one typical example of the type of fuel that may be used.

| | Percent |
|---|---|
| Nitrogen | 53 |
| Hydrogen | 16 |
| Carbon-monoxide | 23 |
| Carbon-dioxide | 8 |

Returning now to the description of the compressor-turbine units 10, each unit 10 includes sets of turbine blading on the rear portions of the rotors 21. The external surfaces of the rotors 21 curve radially inward and rearward from the cylindrical peripheral surfaces 28 to provide the curved rear faces of the rotor enlargements and then continue rearwardly to reduced rotor hubs 37. The hubs 37 are carried in bearings 38 which in turn are supported by spaced webs on the interior of tapered or streamlined caps 40. The caps 40 are centrally mounted in the turbine housings 18 by spaced streamlined vanes 41 and serve to enclose and protect the journaled rear ends of the rotors 21. The abovementioned inwardly and rearwardly curved rear faces of the rotor enlargements, together with the curved forward wall portions of the housings 18, define direction changing annular entrances 42 for the turbines. These entrances 42 have radially facing rather restricted annular mouths or nozzles, open to scrolls 43 for supplying the propellent gases of combustion to the turbines. The turbine entrances 42 curve inwardly and then rearwardly to have rearwardly facing communication with the expansion zones of the turbines. Rows of flow accelerating vanes 7 are arranged in the nozzles of the scrolls 43 where they discharge into the turbine bucket entrances 42, The housings 18 at the rear portions of the rotors 21 are shaped and related to leave or define annular expansion zones of rearwardly increasing area or capacity. Rows of Francis type turbine blading 6 are provided on the rotors 21 to operate in the curved turbine entrances 42 and are acted upon by the expanding gases as they enter the expansion zones of the turbines. The substantially cylindrical turbine portions of the rotors 21 are further provided with rows of impulse type buckets 44 operating between rows of stator blades 45 projecting inwardly from the walls of the housings 18. It will be seen that the expanding gases flowing through the expansion zones of the turbines act upon the blading 6 and 44 to rotate the rotors 21 and that this rotation of the rotors compresses the air and fuel mixture for delivery to the combustion or reaction chamber 11.

Pipes 46 lead from the discharge ends of the turbine housings 18 to an exhaust stack 47 for exhausting the gases after their passage through the turbines. As shown in Figure 2, the pipes 46 curve rearwardly to the stack 47 which may be positioned centrally behind the turbine unit 12.

Provision is made to prevent or reduce the leakage of the compressed air and fuel mixture from the compressors of the units 10 into the turbine expansion zones at or past the peripheral surfaces 28 of the rotors 21. As illustrated on an enlarged scale in Figure 4, labyrinth seals 50 are formed between the peripheral rotor surfaces 28 and the rings 19 surrounding the same. The rings 19 are split or made segmental in order that they may be assembled around the rotors 21 with the labyrinth seals 50 in proper cooperation.

Figure 1:
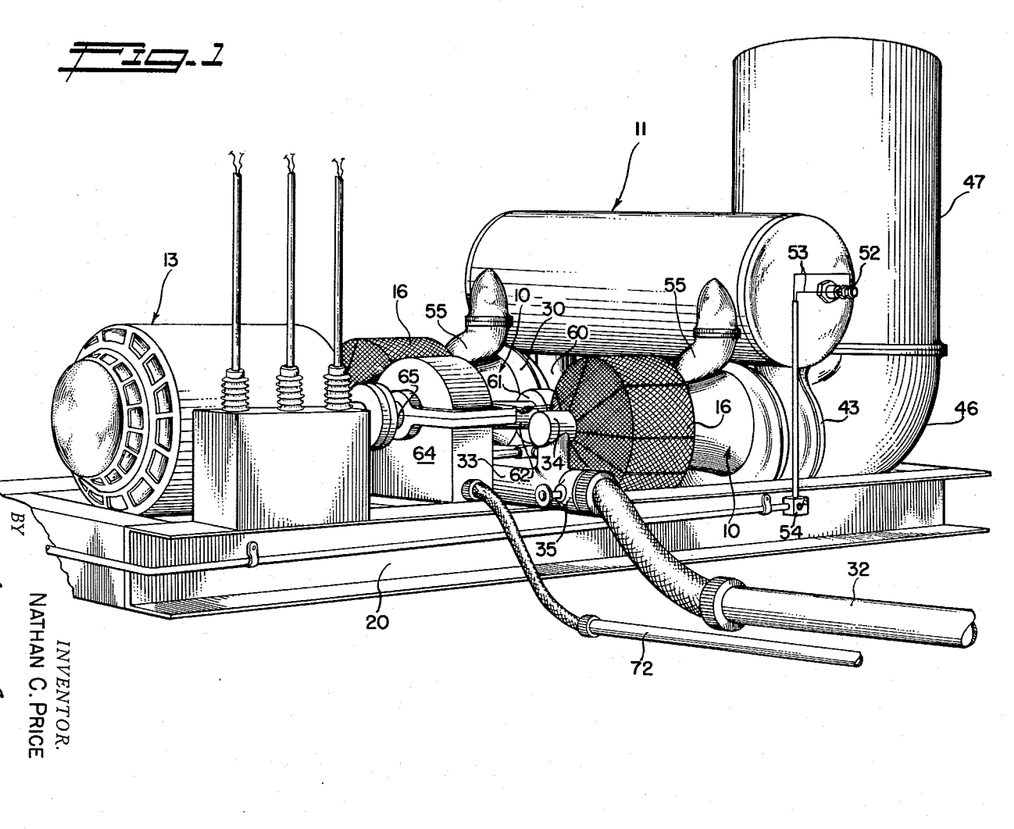
Figure 1 is a perspective view of a power plant of the invention.
Figure 3:
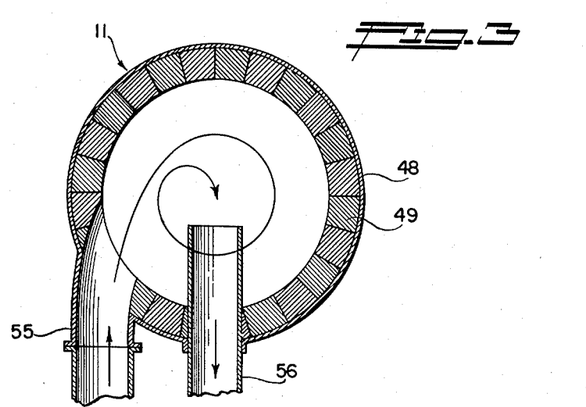
Figure 3 is an enlarged vertical detailed sectional view of the reaction chamber.

The reaction or combustion chamber 11 is provided to receive the compresed air and fuel mixture from the compressors of the units 10 and the fuel mixture is consumed in the chamber to create the hot driving gases for delivery to the turbines of the units 11 and the turbine unit 12. In the particular construction illustrated the chamber 11 is a hollow, generally cylindrical structure, having a wall 48 formed of steel or the like lined with blocks 49 of carborundum or similar material. On starting, a rich near-stoichiometric mixture is automatically provided by the fuel control system, later described. This rapidly heats the surface of the carborundum, which thereafter acts as a strong catalyst, permitting efficient combustion over a much leaner fuel-air ratio range. This is further implemented by the low velocity and high turbulence of the vortex of the chamber. The chamber 11 is arranged transversely above the turbine portions of the units 10 and the unit 12 and is appropriately supported on the base or bed 20. One or more igniting devices 52 are provided to ignite the fuel and air mixture in the chamber 11. In Figure 6, I have shown a resistance-wire type igniter 52 secured in an opening in one end of the chamber 11. Electrical leads 53 extend from the terminals of the igniter 52 to a battery or other source of electrical energy to energize the igniter. A manually operable switch 54 is interposed in one lead 53 to control the igniting device 52. As best shown in Figures 1 and 3, the scrolls 30 receiving the compressed air and fuel mixture from the compressors have pipes or ducts 55 discharging into the interior of the combustion chamber 11 in a generally tangential direction. The scrolls 43 of the turbines have pipes or ducts 56 extending substantially radially into the chamber 11 to have their open receiving ends in the central axial region of the chamber. With this relationship there is a circular or spiral flame vortex in the chamber 11, the flame following a spiral path in the chamber from the ducts 55 to the central region of the chamber and the turbine ducts 56 receiving the gases from this central or inner area. Since the velocity of the air and fuel mixture in the compressors and the compressor ducts is too great to permit efficient combustion or sustained combustion, the igniting device or devices 52 are located in the inner region of the chamber 11 where the velocity is reduced and continuous ignition is assured. The diametral proportions of ducts 55 are such that the air flow velocity therein is approximately 450 ft. per second when the rotors are revolving at full speed. This prevents flame from travelling into the compressors, since the normal rate of flame travel is less than 100 ft. per second in an open passage. During ignition on starting the velocity in the ducts 55 is about 125 ft. per second, which prevents back-firing. The spiral vortex of the mixed air and fuel brings about an efficient distributed and substantially complete combustion. The hot gases for driving the turbines are withdrawn or discharged from the central region of the chamber 11 so that solid matter particles from the insulating blocks 49 cannot pass into the turbines but are trapped within the chamber 11. It will be observed that there is a single or common combustion chamber 11 receiving the compressed air and fuel mixture from the units 10 and supplying the hot propulsive or driving gases to the several turbines of the power plant.

Figure 4:
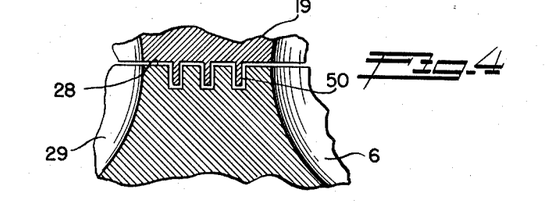
Figure 4 is an enlarged fragmentary sectional view illustrating the labyrinth seal at the periphery of one of the rotors.

The turbine unit 12 is operated or driven by the hot gases of combustion from the combustion chamber 11 and serves to produce shaft horsepower for driving a load such as an electrical generator or the like. In the drawings I have shown the unit 12 spaced between the two compressor-turbine units 10 and in parallel relation thereto, it being understood that while this is probably a preferred relationship in most installations, the unit 12 may be arranged in other positions if desired. The unit 12 includes a forward casing section 58 and a turbine housing 18ᵃ enclosing a rotor 21ᵃ. It is a feature of the invention that the casing section 18ᵃ may be identical with the turbine housings 18 of the units 10 and that the rotor 21ᵃ may be identical with the above described rotors 21 except that the compressor blading 25 and 29 is omitted from the rotor 21ᵃ. This use of identical parts materially reduces the cost of manufacture and greatly simplifies servicing, etc. Where the above named elements are identical, corresponding reference numerals are applied to their corresponding parts throughout the drawings. The rear portion of the rotor 21ᵃ is supported by the bearing 38 within the cap 40 and the rotor carries the turbine blading 6 and 44 operating in the casing section 18ᵃ, all as described above in connection with the units 10. A nozzle ring or scroll 60 joins and has communication with the scroll rings 43 of the unit 10, as shown in Figure 2, and has an annular vaned nozzle throat discharging the hot gases into the annular direction changing entrance to the expansion zone of the unit 12. A split or segmental ring 19 surrounds the intermediate portion of the rotor 21ᵃ and labyrinth sealing means 50, such as illustrated in Figure 4, is provided between the peripheral rotor surface 28 and the ring to prevent an excessive amount of the air and fuel under pressure from blowing by the periphery of the rotor.

The abovementioned forward casing section 58 encloses the unbladed forward portion of the rotor 21ᵃ with clearance and its interior is maintained in communication with the scroll 30 of one of the units 10. A duct 5 extends from an adjacent compressor scroll 30 to the forward portion of the casing section 58 to deliver the compressed air and fuel mixture to the interior of the casing. This compressed mixture flows rearwardly in the casing section 58 and leaks past the seals 50 in limited volume to prevent the gases of combustion from leaking forwardly to the front bearing of the rotor 21ᵃ. The front hub 8 of the rotor is supported in a bearing 22 which in turn is carried in a suitable pillow block 61 mounted on the engine bed 20. A discharge pipe 62ᵃ extends rearwardly from the turbine casing 18ᵃ to exhaust the gases from the unit 12 into the stack 47. The scrolls 43 and 60 are joined and related so that there is a proper balance between the volumes of the hot gas supplied to the units 10 and the unit 12.

As mentioned above, the turbine unit 12 may be utilized to drive any suitable mechanism or load. In the drawings, the load 13 is in the nature of an alternator or generator mounted on the engine bed 20 in axial alignment with the rotor 21ª of the turbine unit 12. A drive shaft 62 is connected with the hub or axle 8 of the rotor 21ª by splines or serrations and extends forwardly toward the generator 13. A suitable speed reduction gear box 64 is connected between the rotor shaft 62 and the shaft 65 of the driven mechanism 13. The present invention is not primarily concerned with the details of the speed reduction gearing and these details are omitted from the description.

The invention provides a simple and very effective means for cooling the rotors 21 and 21ª and their bearings. This means includes an axial duct or opening 66 entering the forward end of each rotor 21 and 21ª and extending forwardly into the thickened intermediate portions of the rotors. Each rotor 21 and 21ª also has a series of circumferentially spaced coolant passages 67 joining the rear end of the fluid opening 66 and extending outwardly therefrom toward the periphery of the rotor. The passages 67 then curve inwardly and rearwardly to substantially follow the contours of the curved rear surfaces of the rotor enlargements and continue rearwardly in spaced parallel relation to the surfaces of the turbine portions of the rotor. The passages 67 are spaced adjacent to and follow the peripheral contours of the rotors to reduce the weight of the peripheral areas to thereby reduce the centrifugal stresses imposed on the rotors during operation. The rear portions of the passages 67 extend inwardly to collecting ducts 68 in the rear axles or hubs 37 of the rotors 21 and 21ª. Radial ports 69 pass outwardly from the ducts 68 through the hubs 37 and the surrounding journal boxes to discharge the coolant into the interiors of the caps 40. The forward ends of the caps 40 are spaced from the peripheries of the rotors 21 and 21ª to leave annular discharge gaps or openings at 70. Cooling fluid admitted to the openings 66 flows rearwardly therethrough to cool the forward rotor bearings 22, then flows through the spaced passages 67 to cool the peripheral areas of the turbine rotor parts, then flows through the passages 68 and openings 69 and into the caps 40 to cool the rear rotor bearings and ultimately discharges from the annular spaces 70 to be carried out the stack 47 with the turbine exhaust gases.

The cooling system just described may utilize either air or water as the cooling medium. Where water is employed the thermal efficiency of the power plant will approach 30% whereas if air is used in the cooling system the thermal efficiency will be in the neighborhood of 20%. In the drawings, I have shown a pipe 72 for carrying cooling water to the power plant and the pipe has branches 73 leading to openings 74 in the stationary front caps 23 of the rotors 21. The openings 74 in turn communicate with the central rotor openings 66. The coolant supply pipe 72 has a third branch 75 discharging into the forward end of the drive shaft 62, the shaft 62 being tubular so as to conduct the coolant to the passage 66 of the rotor 21ª.

The control system 14 of the power plant is operable to maintain substantially constant rotative speed of the turbine unit 12 and its output shaft 62 and embodies elements which prevent the development of excessive temperatures in the turbines. Valves 77 are provided to govern the branch fuel pipes 34 and the control system 14 regulates or operates these valves to govern power plant operation. The valves 77 may be of any suitable kind and in the drawings are represented as butterfly valves, this showing being typical. The valves 77 are connected for simultaneous and corresponding movement. Cranks or levers 78 are fixed to the shafts of the valves 77 and a link 79 has its opposite ends coupled with the valve levers by pin and slot connections 80 which permit arcuate movement of the levers upon axial or translatory motion of the link. The control means 14 includes a remotely operated or controlled device for moving the link 79. This may take the form of a reversible electric motor 81 for rotating a feed screw or advancing screw 82 through the medium of a speed reduction drive 83. A traveling nut 84 operates along the screw 82 and is attached to the link 79 so that rotation of the screw 82 in one direction causes opening movement of the valves 77 and rotation of the screw in the other direction produces closing movement of the valves. An energizing lead 85 of the motor 81 extends to one terminal of an electrical power source 90 and the forward and reverse leads 86 and 87 of the motor extend to spaced stationary contacts 88 and 89 respectively. The completion of the circuit to the motor 81 through the contacts 88 and 89 is under the control of speed responsive and temperature responsive devices described below.

The temperature responsive means includes a thermostatic device sensitive to the temperature in one or more of the turbines or in a scroll ring 43 or 69. In Figures 2 and 6, I have illustrated the thermostat associated with the scroll 43 of a unit 10. The thermostatic device comprises a tube 91 projecting into the scroll 43 and a rod 92 secured to the inner end of the tube and projecting outwardly beyond the scroll. The tube 91 and the rod 92 are formed of materials having markedly different coefficients of thermal expansion and contraction. For example, the tube may be formed of stainless steel and the rod may be constructed of silica. The outer end of the rod 92 has engagement with one side of a lever 93 at a point spaced between the ends of the lever. A spring 94 engages against the other side of the lever 93 to hold it in cooperation with the rod 92. One end of the lever 93 is pivotally connected with a traveling nut 95 and the other end of the lever carries a contactor 96 for cooperating with the spaced stationary contacts 88 and 89. A lead or conductor 63 extends from the other terminal of the electrical power source 90 to the contactor 96. The circuits are such that the motor 81 is energized to rotate the screw 82 in one direction when the contactor 96 moves into engagement with the stationary contact 88 and the motor 81 is energized to rotate the screw in the other direction when the contactor 96 engages the stationary contact 89.

The speed responsive means of the control system 14 includes a suitable speed sensitive device associated with the output shaft 62 of the turbine unit 12. In Figure 6, I have shown in a diagrammatic manner, a fly ball governor 98 driven by a shaft of the speed reduction gearing 64. A slidable rod 99 is arranged adjacent the governor 98 and has a plate or flange 100 acted upon by the governor. A spring 101 engages the flange 100 and urges the rod 99 in one direction. Upon an increase in the speed of rotation of the shaft 62 the governor 98 acts to move the rod in the other direction. The rod 99 carries or operates a contactor 102 connected with one side of the electrical power source 90 by a line 103. The line 103 may connect with the above described lead 63 which extends to the movable contactor 96. The governor actuated contactor 102 is movable between spaced contacts 104 and 105. The contacts 104 and 105 are connected with the forward and reverse leads 106 and 107 respectively of a reversible motor 108 which serves to move or actuate the above mentioned nut 95. The third or common energizing lead 109 of the reversible motor 108 may be connected with the above described energizing lead 85 of the motor 81. The motor 108 is arranged adjacent the nut 95 and drives a lead screw 110 through a suitable speed reduction gearing 111. The screw 110 in turn carries and operates the nut 95 which, as above described is connected with the lever 93. Thus the motor 108 by advancing or retracting the nut 95 operates to move the contactor 96 into and out of engagement with the contacts 89 and 88 to effect movement of the fuel valves 77 toward the open and closed positions. The speed responsive means of the control system 14 comprising the governor 98, the contacts 102, 104 and 105, the motor 108, the screw 110 and the nut 95, is the primary control serving to maintain the rotative speed of the shaft 62 substantially constant. The temperature responsive means of the control system 14 comprising the thermostat 91–92, etc. is a modulating or limiting mechanism which modifies the action of the primary control to prevent the occurrence or development of excessive temperature and hence speed variations in the turbines. The above described speed governor 98 regulates the temperature setting of the thermostat, the latter in turn adjusting the degree of opening of the fuel admission valves 77. The free motion of contactor 102 between the contacts 104 and 105, and the free motion of the contactor 96 between the contacts 88 and 89 is exceedingly small in order to maintain high sensitivity of speed governing.

A starting means is provided to develop pressure in the combustion chamber 11 and turbines to render the power plant self motoring for regular operation under the control of the system 14 just described. The starting means includes an auxiliary or relatively small prime mover such as an internal combustion engine or electric motor, for rotating either one or both of the turbine-compressor rotors 21 to raise the air and fuel mixture to a sufficiently high pressure for starting purpose. It is a feature of the arangement herein described that should a starter connection to only one compressor rotor 21 be provided, the other compressor-turbine rotor will be driven as an air turbine, and starting can be accomploished, in this manner. In Figure 2, I have shown an internal combustion engine 115 such as a motor cycle engine mounted adjacent the stack 47. A protective sleeve or tube 116 extends from the engine 115 and passes through an opening in the wall of the adjacent exhaust pipe 46 to the end of the related rear rotor cap 40. The drive shaft or output shaft 117 of the engine 115 passes through the tube 116 into the cap 40. An appropriate over-running clutch 118 serves to couple the shaft 116 with the rear axle 37 of the rotor 21 during operation of the starting engine 115. The clutch 118 is such that it automatically disengages the engine shaft 117 from the rotor 21 when the speed of the rotor exceeds the speed of the shaft 117 by reason of self motoring of the primary power plant. Auxiliary starting engines and overrunning clutches are well known to those skilled in the art and the details of the engine 115 and clutch 118 are believed unnecessary for a full understanding of the invention. In the drawings I have shown an arangement in which the starting engine 115 drives or rotates both rotors 21, it being understood that if preferred only one rotor may be engine driven during starting so that the other rotor 21 is driven as an air turbine as just described. The illustrated arrangement incudes a starting shaft 117 coupled with the rear of each rotor 21 by an overrunning clutch 118 and a suitable drive connects the two shafts. This drive may take the form of sprockets 125 fixed on exposed rear portions of the shafts and a chain 126 operating over the sprockets. With this structure both rotors 21 are driven by the starting engine 115 to serve as compressors during the initial phases of the starting operation. It will be seen that operation of the rotors 21 by the starting engine 115 develops sufficient prseure in the combustion chamber 11 and turbine to assure ignition of the air and fuel mixture by the igniter 52 and self motoring of the primary power plant.

It is believed that operation of the power plant will be readily understood from the foregoing detailed description. To start the apparatus the starting engine 115 is put into operation to rotate at least one of the rotors 21 and the manual fuel valve 35 is opened to admit fuel to the manifold 33. The compressor blading 25 and 29 of the rotor 21 driven by the engine 115 compresses the air and fuel mixture for delivery to the chamber 11. The switch 54 is closed so that the air and fuel mixture thus supplied to the combustion chamber 11 is ignited. The resultant hot gases of combustion discharge through the scrolls 43 and 60 to act upon the turbine blading 6 and 44 to rotate the rotors 21 and 21ᵃ. Upon the ignition of the gaseous mixture in the chamber 11 the switch 54 may be opened. The compressor blading of both units 10 begins to supply the compressed air and fuel mixture to the chamber 11 and as the pressure rises in the chamber the turbines are driven at increased speed by the resultant hot gases issuing from the chamber. When the rotative speed of the turbine exceeds the speed of the starting engine 115 the clutch 118 automatically disengages and the starting engine may be shut down.

During normal or regular operation of the power plant the gaseous fuel discharged from the branch manifold pipes 34 is sucked or induced into the compressor housings 15 with the inducted air and fuel become compressed and thoroughly mixed in the compressor portions of the units 10. The compressed mixture flows through the scrolls 30 into the chamber 11 where it ignites and the resultant hot gases under pressure discharge through the scrolls 43 and 60 into the turbine portions of the units 10 and 12. The scrolls 43 and 60 and/or the nozzle diaphragms of the three turbines are proportioned and related to provide for the desired proportionate balance between the volumes of hot gases under pressure supplied to the several turbines to thereby obtain efficient operation of the two units 10 and the development of the desired horsepower by the unit 12. Where the rotors 21 and 21ᵃ are approximately 16 inches in diameter the velocity of rotation of the rotors will be less than 20,000 R. P. M., the compressor discharge pressure will be approximately 100 pounds per square inch, and the power plant will develop about 8,000 horsepower. As above described, the cooling water or air admitted to the rotor openings 66 continuously cools the front and rear motor bearings, the peripheral portions of the rotors and the rear rotor caps 40.

The control system 14 operates as previously described to maintain substantially constant speed of the output shaft 62 and prevents excessive variations in the temperature in the turbines. Upon over speeding of the output shaft 62 the governor 98 moves the rod 99 to bring the contactor 102 into engagement with contact 105. This results in energization of the motor 108 and the screw 110 is rotated to move the nut 95 and lever 93 to cause contactor 96 to engage contact 89. This completes a circuit through the lines 85, 63 and 87 to the motor 81 and the motor 81 operates the screw 82 to move the valves 77 toward the closed position, thereby reducing the speed of operation. Conversely, when the power plant speed falls below the desired value the spring 101 pulls the contactor 102 into engagement with contact 104 to complete a circuit to the motor 108. In this instance the motor moves the nut 95 in a direction to bring the contactor 95 into engagement with contact 88. This completes a circuit through lines 85, 63 and 86 to the motor 81 and the motor rotates the screw 82 to move the fuel valves toward the open position. In the event the temperature in the scrolls 43 and 60 become excessive the thermostat tube 91 expands sufficiently to move the rod 92 to a position where the lever 93 has its contactor 96 in engagement with the contact 89. This completes the circuit to the valve operating motor 81 as above described to move the valves 77 toward the closed position. A reduction in the volume of gaseous fuel supplied to the plant reduces the temperature in the scrolls 43 and 60. In this way the temperature responsive means prevents the development of damaging temperatures in the turbines.

Having described only a typical preferred embodiment of my invention I do not wish to be limited to the specific details herein set forth but wish to reserve to myself any features or modifications that may fall within the scope of the following claims.

I claim as my invention:

1. A gas turbine power plant comprising a plurality of functionally parallel units each including a compressor and a turbine, a load driving turbine, means for introducing fuel into the compressors of said units, and a combustion chamber in receiving relation to the outlets of said compressors and delivering hot combustion gases to the first and second mentioned turbines to drive the same, said first mentioned turbines driving the compressors of their respective units.

2. A gas turbine power plant comprising a plurality of units each including a compressor housing, a turbine casing and a rotor having compressor blading operating in the compressor housing and turbine blading operating in the turbine casing, said units being in functionally parallel relation, a load driving turbine, a combustion chamber receiving compressed air from the compressor housings and adapted to discharge gases of combustion into the load driving turbine to drive the same and into said turbine casings to act on said turbine blading to drive the rotors, and conduit means for introducing fuel into said air.

3. A gas turbine power plant comprising a plurality of units each including a compressor housing, a turbine casing and a rotor having compressor blading operating in the compressor housing and turbine blading operating in the turbine casing, said units being in functionally parallel relation, a load driving turbine, means for introducing fuel into said compressor housings to be mixed and compressed with the air handled by the compressor blading, a combustion chamber receiving the compressed air and fuel mixture from the compressor housings and adapted to discharge gases of combustion into the load driving turbine to drive the same and into said turbine casings to act on said turbine blading to drive the rotors.

4. A power plant comprising a plurality of units each including a compressor housing having an inlet for receiving the air to be compressed, a turbine casing, a single rotor having compressor blading operating in the housing and turbine blading operating in the casing, diffuser means in communication with the outlet of the housing, and nozzle means at the inlet of the casing, fuel discharging pipes for supplying gaseous fuel to the inlets of said housings to be compressed with the air received therein, a load driving turbine, inlet nozzle means for the turbine in direct communication with the nozzle means of said casings, and a combustion chamber receiving the compressed air and fuel mixture from the diffuser means of said units and supplying hot combustion gases to said nozzle means to drive said rotors and said turbine.

5. A power plant comprising a plurality of units each including a compressor housing having an inlet directly open to the atmosphere and receiving the air to be compressed, a turbine casing, a rotor having compressor blading operating in the housing and turbine blading operating in the casing, diffuser means in communication with the outlet of the housing, and an inlet nozzle ring at the inlet of the casing, means for supplying fuel to the inlets of said housings to be induced therein with the compressed air, a load driving turbine having a nozzle in direct communication with the nozzle rings of said units, and a combustion chamber receiving the compressed air and fuel mixture from the diffuser means of said units and discharging hot combustion gases into said nozzle rings to drive said rotors and said turbine.

6. A power plant comprising a pair of spaced units each including a compressor housing having an inlet receiving atmospheric air for compression, a turbine casing, a rotor having compressor blading operating in the housing and turbine blading operating in the casing, a diffuser scroll for the outlet of the housing and a nozzle ring for the inlet of the casing, pipe means for supplying fuel at the inlets of the compressor housings of the units, a turbine spaced between said units and having an inlet nozzle ring in communication at substantially diametrical regions with the nozzle rings of said units for induction therein with said air, and a combustion chamber receiving the compressed air and fuel mixture from the diffuser scrolls of said units and discharging combustion gases into said communicating nozzle rings to drive the rotors and said turbines.

7. A power plant comprising a pair of spaced substantially identical units each including a compressor housing having an inlet receiving atmospheric air for compression, a turbine casing, a rotor having compressor blading operating in the housing and turbine blading operating in the casing, a diffuser scroll for the outlet of the housing and a nozzle ring for the inlet of the casing, means for supplying fuel at the inlets of the compressor housings of the units for induction therein with said air, a turbine spaced between and substantially parallel with said units, said turbine including an inlet nozzle ring between and having substantially diametrically opposite portions thereof communicating with the nozzle rings of said units, and a combustion chamber extending transversely of said units and turbine for receiving the compressed air and fuel mixture from the diffuser scrolls of said units and discharging combustion gases into said communicating nozzle rings to drive the rotors and said turbine.

8. A power plant comprising a plurality of units each including a compressor housing, a turbine casing, a rotor having compressor blading operating in the housing and turbine blading operating in the casing, diffuser means in communication with the outlet of the housing, and nozzle means at the inlet of the casing, means for supplying gaseous fuel to the inlets of said housings to be compressed with the air received therein, a load driving turbine having inlet nozzle means, a generally cylindrical combustion chamber, ducts leading from said diffuser means and having outlets directed to discharge the compressed fuel and air mixture into the chamber in a tangential direction relative to the generally cylindrical chamber to produce a spiral vortex of flame in the chamber, and ducts leading from the central region of the chamber for discharging the gases of combustion from the chamber into said nozzle means to drive said rotors and turbine.

9. A power plant comprising a plurality of units each including a compressor housing, a turbine casing, a rotor having compressor blading operating in the housing and turbine blading operating in the casing, diffuser means in communication with the outlet of the housing, and nozzle means at the inlet of the casing, means for supplying gaseous fuel to the inlets of said housings to be compressed with the air received therein, a load driving turbine having inlet nozzle means in communication with the nozzle means of the casing, a generally cylindrical combustion chamber, ducts leading from said diffuser means and having outlets directed to discharge the compressed fuel and air mixture into the chamber in a tangential direction to produce a spiral vortex of flame in the chamber, and ducts for discharging the gases of combustion into said nozzle means to drive said rotors and turbine, the last named ducts extending into the central axial region of the chamber to receive said gases from the interior of said vortex.

10. A power plant comprising a plurality of functionally parallel units each including a compressor housing having an inlet open to the atmosphere to receive atmospheric air, a turbine casing, a rotor having compressor blading operating in the housing and turbine blading operating in the casing, diffusion means in communication with the outlet of the housing, and nozzle means at the inlet of the casing, pipe means for supplying gaseous fuel to the inlets of said housings to be compressed with said air received therein, a load driving turbine, a common combustion chamber receiving the compressed air and fuel mixture from the diffuser means of said units and adapted to supply combustion gases to said nozzle means to drive said rotors and to supply said gases to the turbine to drive the same, igniting means for igniting the mixture in the chamber, and starting means for rotating the rotor of one of said units.

11. A power plant comprising a plurality of functionally parallel units each including a compressor housing having an inlet open to the atmosphere to receive atmospheric air, a turbine casing, a single rotor having compressor blading operating in the housing and turbine blading operating in the casing, diffuser means in communication with the outlet of the housing, and nozzle means at the inlet of said casing, pipe means for supplying gaseous fuel to the inlets of said housings to be compressed with the air received therein, a load driving turbine, said turbine including a casing and a turbine rotor operating therein, a combustion chamber receiving the compressed air and fuel mixture from the diffuser means of said units and supplying combustion gases to said nozzle means to drive the rotors of said units and supplying said gases to the casing of said turbine to drive the rotor therein, said rotors having internal cooling passages following generally the external contours of the rotors, and means for supplying a cooling medium to said passages for flow therethrough.

12. A power plant comprising a plurality of functionally parallel units each including a compressor having an inlet for atmospheric air and a turbine, a load driving turbine, fuel supply means for delivering fuel to the compressors of said units, a common combustion chamber receiving the compressed air and fuel mixture from the compressors of said units and discharging combustion gases into the turbines of said units and said load driving turbine to drive the same, and a system responsive to the speed of the load driving turbine for regulating the fuel supply means.

13. A power plant comprising a plurality of functionally parallel units each including a compressor having an inlet receiving atmospheric air and a turbine, a load driving turbine, fuel supply means for delivering fuel to the compressors of said units, a common combustion chamber receiving the compressed air and fuel mixture from the compressors of said units and discharging combustion gases into the turbines of said units and said load driving turbine to drive the same, a system responsive to the speed of the load driving turbine for regulating the fuel supply means, and means responsive to the temperature of said gases for acting on said system to prevent the development of excessive temperature variations in the turbines.

14. A power plant comprising a plurality of units each including a compressor and a turbine, a load driving turbine, fuel supply means for delivering fuel to the compressors of said units, a combustion chamber receiving the compressed air and fuel mixture from the compressors of said units and discharging combustion gases into the turbines of said units and said load driving turbine to drive the same, said fuel supply means including conduits for conducting fuel to said compressors, and a system for controlling said conduits to maintain the speed of said load driving turbine substantially constant including valves for the conduits, operating means for the valves, and means responsive to the speed of said load driving turbine for controlling the operating means.

15. A power plant comprising a plurality of units each including a compressor and a turbine, a load driving turbine, fuel supply means for delivering fuel to the compressors of said units, a combustion chamber receiving the compressed air and fuel mixture from the compressors of said units and discharging combustion gases into the turbines of said units and said load driving turbine to drive the same, said fuel supply means including conduits for conducting fuel to said compressors, and a system for controlling said conduits to maintain the speed of said load driving turbine substantially constant including valves for the conduits, operating means for the valves, switch means for the operating means, governor means responsive to the speed of said load driving turbine for operating the switch means, and means responsive to the temperature of said gases for acting on the switch means to prevent the development of excessive temperature variations in the turbines.

16. A gas turbine power plant comprising a plurality of units each including a compressor housing, a turbine casing and a rotor having compressor blading operating in the compressor housing and turbine blading operating in the turbine casing, a load driving turbine, a combustion chamber receiving compressed air from the compressor housings and adapted to discharge gases of combustion into the load driving turbine to drive the same and into said turbine casing to act on said turbine blading to drive the rotors, regulable means for supplying fuel to the compressor housings of said units, thermostatic means responsive to the temperature of said gases for regulating the fuel supply means, the thermostatic means including a mechanism for adjusting its temperature setting, and means sensitive to the speed of operation of the load driving turbine for controlling said mechanism to adjust said temperature setting.

17. A gas turbine power plant comprising a plurality of units each including a compressor housing, a turbine casing and a rotor having compressor blading operating in the compressor housing and turbine blading operating in the turbine casing, a load driving turbine, means for introducing fuel into the air received and compressed in said housings, valve means for controlling such introduction of fuel, a combustion chamber receiving the compressed air and fuel mixture from the compressor housings and discharging hot gases of combustion into the load driving turbine to drive the same and into said turbine casings to drive said rotors, operating means for said valve means, regulable thermostat means sensitive to the temperature of said gases for controlling said valve operating means, and means responsive to the speed of the load driving turbine for regulating the temperature setting of the thermostat means.

References Cited in the file of this patent

UNITED STATES PATENTS

| 1,838,477 | Elsea | Dec. 29, 1931 |
| 1,868,143 | Heinze | July 19, 1932 |
| 1,938,688 | Brooke | Dec. 12, 1933 |
| 2,078,956 | Lysholm | May 4, 1937 |
| 2,131,781 | Lysholm | Oct. 4, 1938 |
| 2,225,310 | Lindhagen | Dec. 17, 1940 |
| 2,245,954 | Anxionnaz | June 17, 1941 |
| 2,247,845 | Meyer | July 1, 1941 |
| 2,280,765 | Anxionnaz et al. | Apr. 21, 1942 |
| 2,372,686 | Sédille | Apr. 3, 1945 |
| 2,374,239 | Sédille | Apr. 24, 1945 |
| 2,409,176 | Allen | Oct. 15, 1946 |
| 2,428,830 | Birmann | Oct. 14, 1947 |
| 2,432,177 | Sédille | Dec. 9, 1947 |
| 2,435,236 | Redding | Feb. 3, 1948 |
| 2,439,717 | Cooke | Apr. 13, 1948 |
| 2,465,099 | Johnson | Mar. 22, 1949 |
| 2,529,506 | Lloyd et al. | Nov. 14, 1950 |
| 2,600,235 | Galliot | June 10, 1952 |
| 2,601,194 | Whittle | June 17, 1952 |
| 2,602,289 | Anxionnaz et al. | July 8, 1952 |

FOREIGN PATENTS

| 935,322 | France | Feb. 2, 1948 |
| 594,207 | Great Britain | Nov. 5, 1941 |